(12) United States Patent
Gargi

(10) Patent No.: US 8,856,105 B2
(45) Date of Patent: Oct. 7, 2014

(54) DYNAMIC DATA NAVIGATION

(75) Inventor: Ullas Gargi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 363 days.

(21) Appl. No.: 11/413,808

(22) Filed: Apr. 28, 2006

(65) Prior Publication Data

US 2007/0255745 A1 Nov. 1, 2007

(51) Int. Cl.
*G06F 7/00* (2006.01)

(52) U.S. Cl.
USPC .......................................................... 707/722

(58) Field of Classification Search
USPC ........... 707/102, 3–5, 722, 758, 771, 999.003
See application file for complete search history.

(56) References Cited

U.S. PATENT DOCUMENTS

| | | | | |
|---|---|---|---|---|
| 6,751,611 B2 * | 6/2004 | Krupin et al. ..................... 707/3 |
| 6,785,688 B2 * | 8/2004 | Abajian et al. ................ 707/102 |
| 6,993,532 B1 | 1/2006 | Platt et al. |
| 7,146,362 B2 * | 12/2006 | Allen et al. ....................... 707/5 |
| 7,221,809 B2 * | 5/2007 | Geng ............................ 382/280 |
| 7,325,201 B2 * | 1/2008 | Ferrari et al. ................. 715/737 |
| 2002/0194197 A1 * | 12/2002 | Flank ........................ 707/104.1 |
| 2003/0212659 A1 | 11/2003 | Ban |
| 2004/0044661 A1 * | 3/2004 | Allen et al. ....................... 707/3 |
| 2004/0059729 A1 * | 3/2004 | Krupin et al. .................... 707/3 |
| 2005/0234891 A1 * | 10/2005 | Walther et al. ................... 707/3 |
| 2006/0036568 A1 * | 2/2006 | Moore et al. ...................... 707/1 |
| 2006/0080335 A1 * | 4/2006 | Freeborg et al. .............. 707/100 |
| 2006/0155757 A1 * | 7/2006 | Williams et al. .......... 707/103 R |
| 2006/0156245 A1 * | 7/2006 | Williams et al. ............... 715/764 |
| 2006/0204142 A1 * | 9/2006 | West et al. ..................... 382/305 |
| 2006/0236216 A1 * | 10/2006 | Blackwell ....................... 715/500 |
| 2006/0288039 A1 * | 12/2006 | Acevedo-Aviles et al. .......................... 707/104.1 |
| 2007/0033228 A1 * | 2/2007 | Fassett et al. ............... 707/104.1 |
| 2007/0124293 A1 * | 5/2007 | Lakowske et al. ................. 707/3 |
| 2007/0186235 A1 * | 8/2007 | Jarman et al. ................... 725/28 |
| 2007/0233654 A1 * | 10/2007 | Karlson et al. .................... 707/3 |
| 2007/0282769 A1 * | 12/2007 | Bierner .......................... 706/20 |
| 2008/0010263 A1 * | 1/2008 | Morton ............................. 707/4 |
| 2008/0010264 A1 * | 1/2008 | Morton et al. ..................... 707/4 |
| 2008/0010276 A1 * | 1/2008 | Morton et al. ..................... 707/5 |
| 2008/0027913 A1 * | 1/2008 | Chang et al. ...................... 707/3 |
| 2008/0189269 A1 * | 8/2008 | Olsen ............................... 707/5 |

FOREIGN PATENT DOCUMENTS

| | | |
|---|---|---|
| EP | 1 566 743 A | 8/2005 |
| JP | 11-296533 | 10/1999 |
| JP | 2004341724 | 12/2004 |
| WO | WO 01 90949 A | 11/2001 |
| WO | 03038680 | 5/2003 |
| WO | 2004081823 | 9/2004 |

OTHER PUBLICATIONS

Hearst et al., "Finding the flow in website search," Communications of the ACM, vol. 45, No. 9. Sep. 2002.

(Continued)

*Primary Examiner* — Mohammed R Uddin

(57) ABSTRACT

The disclosure provides a method and system for dynamic data navigation. The method may include receiving a data set request, dynamically identifying metadata for items in the data set, creating groupings of items in the data set based on the identified metadata, and displaying the groupings. The system may include a display, a user input; and a data navigation program.

21 Claims, 3 Drawing Sheets

(56) References Cited

OTHER PUBLICATIONS

PCT Search Report, Application No. PCT/US2007/009709, European Patent Office (Jan. 2, 2008).

Yee, et al., Association for Computing Machinery, "Faceted Metadata for Image Search and Browsing," CHI 2003 Conference Proceedings, Conference on Human Factors in Computing Systems, Fort Lauderdale, FL, p. 1-8 (Apr. 5-10, 2003).

Hearst, "Clustering Versus Faceted Categories for Information Exploration," Communications of the ACM, vol. 49, No. 4, p. 59-61 (Apr. 2006).

Government of India Patent Office, Indian Appl. No. 5735/CHENP/2008, First Examination Report dated Jun. 17, 2013 (2 pages).

The International Bureau of WIPO, Int. Appl. No. PCT/US2007/009709, International Preliminary Report dated Nov. 6, 2008 (7 pages).

European Patent Office, EP Appl. No. 07755827.8, Communication Pursuant to Article 94(3) dated Jun. 18, 2009 (4 pages).

European Patent Office, EP Appl. No. 07755827.8, Communication Pursuant to Article 94(3) dated Feb. 4, 2011 (5 pages).

European Patent Office, EP Appl. No. 07755827.8, Summons to Attend Oral Proceedings pursuant to Rule 115(1) dated Jan. 16, 2012 (7 pages).

* cited by examiner

DYNAMIC DATA NAVIGATION

BACKGROUND

1. Field of the Invention

The present invention relates to navigation systems for data collections.

2. Description of Related Art

As memory devices are able to store greater amounts of data in smaller spaces, it is becoming increasingly difficult for users to effectively navigate through stored data in order to find items of interest. For example, today's MP3 players are capable of storing thousands of songs, and presumably this number will only increase through the years. While having thousands of stored songs to select from offers the user a wide range of variety, it also increases the complexity and frustration that might be felt by the user when trying to find a particular song to listen to. Moreover, unless the user has a clear choice in mind, sometimes the sheer number of choices available makes it almost impossible for a user to decide what to listen to. Furthermore, because MP3 players are typically portable, there is significant pressure to produce smaller and smaller players, which results in smaller and smaller display screens, which can make item selection even more difficult, as a user may have to navigate through many different screens in order to find a desired item.

Moreover, in some cases, a user may be provided with a collection of items the contents of which are entirely unknown to the user. These types of "blind" data navigation situations are often encountered, for example, on the internet. For instance, a museum may provide a website catalogue including pictures of some or all of their pieces. A user may wish to navigate through the museum catalogue, either to find a particular item or interest, or simply to browse the collection. However, even a small museum may have thousands upon thousands of individual items in their collection and finding a particular item or browsing through so many items in such a large collection can be a daunting task.

Accordingly, systems for large-scale data navigation have been proposed. Typically, these systems rely on information that has been associated with each data item, generally referred to as "metadata," in order to categorize a given data item. The metadata often consists of a number of orthogonal attributes, which may or may not be arranged in a hierarchy or taxonomy. For example, a given MP3 song may include metadata providing the song's title, artist, album title, distributor, genre, etc.

Some data navigation tools use a strict hierarchy of metadata attributes. For example, a music browsing scheme may require that the user first select an artist, then an album title, and then a song. However, such a hierarchical approach may not work in all situations, for example when a user does not know the name of the artist performing a particular or song, or when a given song's metadata does not include the artist's name.

Faceted metadata systems do not use a hierarchical system and instead considers all the different attributes to be equal facets of the items. Faceted systems typically allow users to view all the different facets, or metadata categories, available for the items in the collection and then progressively pick, in any sequence, facets that narrow the collection. Examples of faceted metadata systems include UC Berkeley's Flamenco system and HPL Bristol's SWAD-E system. See also, Ranganathan, S. R. Elements of Library Classification. $3^{rd}$ ed. New York, Asia Publishing House (1962). However, while these faceted systems allow users to select items based on all available metadata, they generally do very little to guide the user as to which facet, among possibly hundreds, will be most useful in navigating a collection. Moreover, many of these systems use a static pre-assigned list of metadata categories so that items are only categorized properly if they include metadata that satisfies one of the pre-assigned metadata categories. Furthermore, when dealing with systems where user displays or interfaces have a limited size, a system that provides a user with a large number of selections from which to choose is cumbersome and often impractical. Accordingly, it will be appreciated that alternate methods and systems for data navigation are desirable.

BRIEF SUMMARY OF THE INVENTION

The disclosure provides a method and system for dynamic data navigation. The method may include receiving a data set request, dynamically identifying metadata for items in the data set, creating groupings of items in the data set based on the identified metadata, and displaying the groupings. The system may include a display, a user input; and a data navigation program.

DETAILED DESCRIPTION

The present disclosure provides methods and systems for dynamically navigating datasets.

According to one or more embodiments, the present disclosure can be used to aid a user wishing to navigate through both static and dynamic collections of items.

Figure 1:
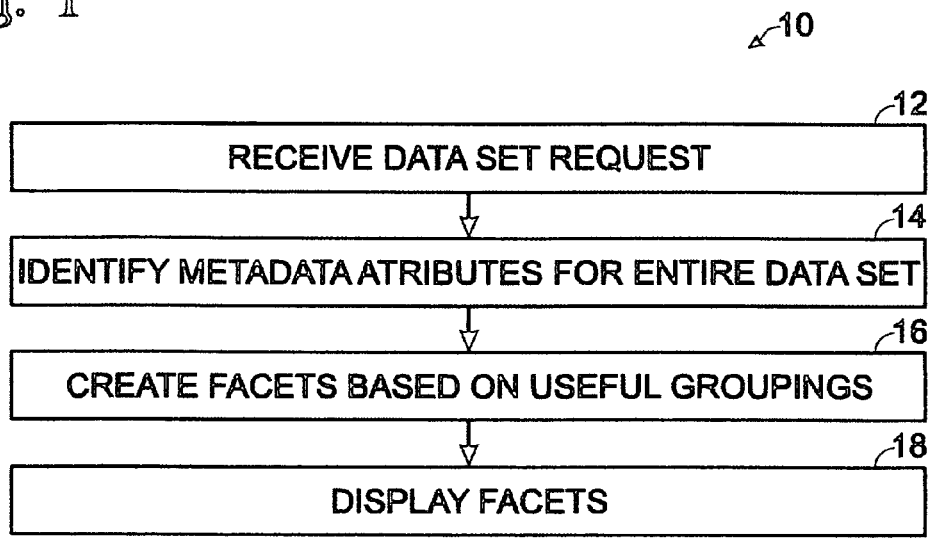
FIG. 1 provides a flowchart of a data navigation system according to one embodiment of the present invention.

FIG. 1 is a flowchart describing one exemplary method 10 according to the present invention. As shown, at 12 the method provides for receiving a data set request from a user. For the purposes of the present disclosure, a data set request may take any form in which a user indicates, through any means, that he would like to browse through and/or find an item in a collection. Accordingly, a data set request may take the form of a search request entered into a search engine tool bar. Alternatively, a data set request may be made simply by selecting a menu item or opening one or more files containing a collection of items. Those of skill in the art will be familiar with other ways in which a user could indicate a desire to browse through a collection of items and/or identify or find a particular item. For the purposes of the present disclosure, the term "collection" is intended to mean the set of items that is identified as the results or response to the user's data set request. For example, if the data set request is a search query provided to a search engine, the "collection" is all of the items in the search results, e.g. the search "hits." If the data set request is opening a directory (e.g. a directory in which photographs have been stored), the "collection" is all of the items in the file (e.g. all the photographs).

Electronic data, whether in the form of MP3 files, photographs, documents, or the like, typically includes metadata, or data about the data, that provides descriptive information about the data. For example, as stated above, an MP3 song may include information such as the artist, composer, track number, album title, distributor, length, etc. while a digital photo may include metadata providing the date and time the picture was taken, the model number of the camera used to take the photograph, etc. Similarly, an electronic document may provide information such as publisher, publication date, author, title, keywords, length of the document, etc. It should be appreciated that a particular item may have any number of metadata attributes associated with it. Accordingly, the number of metadata attributes for an item may be very large, for example, several hundreds.

For the purposes of the present disclosure, the term "metadata attribute" is used to indicate the descriptor for the type of information that is being provided. For example, the terms "artist" and "song title" could each be a metadata attribute. Correspondingly, the term "attribute value" is used to indicate the actual information that is provided for a particular item, i.e. "The Beatles" and "Yesterday" could each respectively be values for the attributes "artist," and "song title."

The above examples provide metadata that could be, though are not necessarily, created automatically by the software programs that initially create the data. For example, a camera's internal software could automatically assign attribute values for a number of different metadata attributes at the time a photograph is taken. However, there currently is no standardization of the attributes that are automatically associated with different file types. Accordingly, a first camera (or other device) may identify and assign a first set of attributes while a second camera (or other device) may identify and assign a second set of attributes with some, or no, overlap between the attribute sets.

Moreover, metadata may also or alternatively be manually associated with a given item. For example, in a museum website displaying photographs of art from the museum, a museum curator may include metadata about the specific piece of art being displayed including attributes such as title of the piece, name of the artist, genre of art, owner of the piece, etc.

Accordingly due to lack of standardization and because some or all of the information may be added manually, it should be understood that metadata attributes may be different even for the same or similar types of data (i.e. photos, MP3s). Moreover, it will be understood that even if there was standardization within a given type of data, certain data set requests (e.g. a search request) could return many different types of data having different attributes associated therewith.

Accordingly, at 14, the method provides for identifying the available metadata attributes for the items contained in the collection. By way of explanation, and without wishing to be limited in any way, a user may access a file sharing website providing files available for download. Each file may have metadata associated with it, but the types of metadata provided may not take any regular form. For example, if data on the file sharing website is songs, some of the songs may have metadata attributes providing the artist name, song title, track number, album name, and track length. Other songs may have metadata attributes that provide genre of music, composer, artist name, song title and album title.

As stated above, method 10 provides for the identification of all the different metadata attributes associated with all of the data within the user-requested collection. Accordingly, in the file sharing website example provided above, the method would identify the following metadata attributes: artist name, song title, track number, album title, track length, genre of music, and composer.

According to some embodiments, the identification of metadata attributes may take place dynamically. By this it is meant that the identification of the metadata attributes may be performed each time a data set request is received from a user. This allows the method to incorporate any new data items, and therefore any new metadata attributes that have been added to the collection since the last data set request. For example, users may upload or otherwise make available songs to the file sharing website at any time. Accordingly a user may access the website in the morning, when the website has access to 1000 songs which, in combination, are associated with the following metadata attributes: artist, song title, album title, and composer. The same or a different user may access the website at another time, e.g. 1 minute later, 10 minutes later, in the afternoon, or several days or months later. At this later time, the website may have access to 5000 songs which, in combination, are associated with the following metadata attributes: artist, song title, album title, composer, track number, and genre of music. In this example, none of the songs that were available in the morning had the metadata attributes track number and genre of music associated with them. However, some or all of the songs that were available at the first time may still be available at the later time, since in this example the method identifies all of the available metadata attributes regardless of whether some of the data items lack some of the metadata attributes. Of course it will be understood that it is also possible for the method to identify only those metadata attributes that are shared by all items. Alternatively, the method may identify metadata attributes that are shared by at least a certain number or percentage of items in the collection.

At 16, the identified metadata attributes along with the associated attribute values are then used to create discriminative facets that are based on useful metadata groupings. For the purposes of the present disclosure, the term "discriminative" means that the facet, sub-grouping, or the like, organizes the collection in a "nice" way, i.e. that the distribution of values for that facet makes it easy for a user to find desired content by going through the different values or ranges.

According to one embodiment, useful metadata groupings are achieved when the data in the collection is divided into somewhat evenly distributed categories. It will be appreciated that it is not necessary that the method identify metadata groupings that divide the data collection into perfectly equal proportions, but rather that each metadata grouping includes a reasonable number of items, or categories of items, from the collection. What is reasonable in a given situation will typically be determined by a given application.

One factor in determining what a useful metadata grouping should be and how many facets should be displayed to the user is the capability of the client that will be displaying the facets. For example, the size of the display screen or the type and capability of the user input device associated with the client may factor into or determine the suitable number of facets that should be displayed. For example, in the file sharing scenario above, let us assume the file sharing website has 10,000 songs available with a total of 30 metadata attributes. If a user accesses the web site via a home computer with a standard monitor, it may be useful to display all 30 of the available metadata attributes as facets. Alternatively, if the user accesses the website via a cell phone or PDA having a small display screen, it may be more useful to display a smaller number of facets, such as 2, 3, 4, or more, depending on the display screen size and scrolling capability. Of course it will be appreciated that a user, even one using a home computer, may not be interested in viewing all 30 metadata attributes, and therefore a suitable number of facets may be provided to the user. According to one embodiment, a suitable number of facets may be between 5 and 12. However, it will be appreciated that the number of facets shown may be dependent on any number of factors including user preference, the device on which the categories are being displayed, the particular application, etc. Accordingly, both applications in which between two and several hundred (or more) metadata attributes are identified and in which every identified metadata attribute is displayed as an individual facet and applications in which between two and several hundred (or more) metadata attributes are identified and in which only a few metadata attributes are displayed as facets are contemplated by the present disclosure.

When the number of displayed facets is less than the total number of metadata attributes identified, it may be useful to select those metadata attributes that divide the items into more easily manageable groupings. For example, in the file sharing scenario with 10,000 available songs and where there are 15 identified attributes, it may be discovered that there are 2 attributes which are not useful, either because they have the same value for every song or because they have a different value for every song, that there are 10 attributes that have the same value for a large percentage of songs, and that there are 3 attributes that provide a relatively even distribution of songs over a total of 5, 10, and 15 values, respectively. Accordingly, the 3 attributes may be provided to the user as discriminative facets.

As a specific example, it will be appreciated that in a collection that consists only of songs performed by The Beatles, a metadata attribute of "artist name" might not be very useful as a facet, since presumably every song, or nearly every song, in the collection would have The Beatles listed as the value for the artist name attribute and the user would not save any time or effort by selecting this facet. However, a metadata attribute of album title, might be a useful facet that results in a fairly even distribution of the songs in the collection. (I.e. each album title may have somewhere in the neighborhood of 1-20 songs associated with it). On the other hand, in a collection that consists only of one hit wonders (e.g. artists who have only had one commercially successful song), the album title metadata category might not be very useful, since presumably no album would be associated with more than one song and, again, the user would not save any time or effort by selecting this category. However, a metadata attribute of year of release might be a useful facet that results in a fairly even distribution of the songs in the collection.

The use of the term "a more easily manageable grouping" should not be interpreted to imply that the user should or even could browse through all the items in the grouping, but rather, may simply allow the user to quickly identify and select a category in which items of interest are more (or less) likely to reside. Furthermore, it will be appreciated that, as described in greater detail below, upon selecting one grouping, the user may be presented with additional groupings in order to further narrow down the items to be viewed.

It should be appreciated that any number of methods may be used to create useful groupings. According to one embodiment, given a collection of items that has been identified as a data set request from a user, a candidate list of metadata attributes is fixed a priori, but allows for some human intervention. For each candidate attribute, the data type is stored. Type may be, for example, numerical, string, or enumerated list. For each attribute, a measurement of the attributes discriminative power over the current collection of items is computed and the top X number of discriminative attributes are presented as facets.

In a non-limiting example of how discriminative facets may be selected, a collection of 10000 digital images residing on a server may include fifty different attributes for each image. These attributes may, for example, be date/time stamp (indicating the date and time the photograph was taken), number of faces, type of camera used to take the photograph, name of person submitting the image to the collection, focal length, exposure time, camera focus distance, latitude and longitude where photograph was take, etc. A user wishing to browse the collection may be unfamiliar with the collection or may be using a device having limited capability such as a small display screen size. In either of these two cases, the system may be designed to automatically select two of the available fifty attributes as facets to display to the user. In order to select which of the fifty attributes should be displayed as the two facets, a discriminative score, which is a reflection of the discriminative power of using that attribute as a facet, may be determined for each attribute in the collection.

For example, a discriminative score for the date/time stamp may be determined by running an algorithm that counts the distinct number of days appearing as values for the date/time attribute within the collection. Alternatively or additionally, the date/time values may be clustered using a suitable algorithm and the number of clusters may be counted. The number of distinct dates (or clusters) may then be counted in order to obtain a discriminative score for the date/time attribute. If the number of dates or clusters falls with a range that matches the user interface requirement (e.g. a small number that is easy for the user to select from and/or a number that will fit or be convenient to view on the display screen) then the date/time stamp may be given a high discriminative score.

A discriminative score for the number of faces attribute may be determined by counting the number of faces in each image and determining how many images show the same number of faces grouped together (e.g. only 1 face, 2 faces, 3 faces, etc.) If the number of groups is within a range that matches the user interface requirement (e.g. a small number that is easy for the user to select from and/or a number that will fit or be convenient to view on the display screen) then the number of faces attribute may be given a high discriminative score. In this case, each group will include a specific number of images. If the distribution of the images across the groups is fairly even, the number of faces attribute may be given a high discriminative score because breaking up the collection into groupings that have a relatively even distribution of items allows the user to more quickly narrow down the collection when selecting subgroups. Conversely, if the distribution of the images across the group is highly skewed, the number of faces attribute may be given a low discriminative score, as this is less helpful to the user because selecting a subgroup with many items does not narrow down the collection and selecting a subgroup with very few items may not result in the user finding what he is interested in.

Other attributes may be given discriminative scores in a similar manner by determining whether the items in the attribute can be clustered into well-separated groups that are sufficient for the user's purposes.

The discriminative scores are then compared and attributes associated with the top two scores will be displayed to the user as facets. According to one embodiment, if the attributes are of the same type, discriminative scores are compared directly, if the attributes are of different types, the system may be configured to select one facet (e.g. the highest scoring attribute) from each type of attribute, or employ any other suitable method for selecting between attributes with sufficiently high discriminative scores.

If the user selects one of the two displayed facets, for example, if the number of faces attribute is displayed as a facet and selected, the sub-groupings corresponding to the number of faces (i.e. 1 face, 2 faces, 3 faces, etc.) are displayed. The user may then select one of these sub-groupings to view the corresponding photographs. Alternatively or additionally, if desired, the number of photographs in the selected sub-grouping may be subjected to additionally clustering or grouping. For example, if the 2 faces sub-grouping includes 2000 photographs, the system may identify the attributes associated with the 2000 photographs and select appropriate facets for display to the user in the manner described above.

As indicated above, discriminative power may be determined using various calculations based on the type of data in the attribute. For example, a measure of variance may be used to judge discriminative power for numeric facets. For time date values, a time clustering algorithm may be used to cluster the items and if the number of clusters is in a desired range, the facet may be given a high score. For strings and enumerated list types, the discriminative power may be the number of distinct values. For date/time values (e.g. the capture time for a digital photograph), the number of distinct days may be counted. Alternatively or additionally, the date/time values may be clustered using a suitable algorithm and the number of clusters may be counted. Alternatively, as described below, a measure of string dissimilarity for string typed facets may be used.

It will be appreciated that some metadata categories may include a large number of values that may be applicable to the same metadata attribute for the same item. For example, using the file sharing scenario described above, the "genre of music" category may include a wide variety of values that are rather subjective in nature, e.g. rock, pop, alternative, and/or top 40, may all be used to identify a genre for the same piece of music. Similarly, a song from the musical Phantom of the Opera might easily be labeled with the genre values musical, rock, opera, classical, and/or soundtrack.

Those of skill in the art will be familiar with string dissimilarity, which produces a statistical measurement of the likelihood that two strings are similar or dissimilar to each other. Accordingly, method 10 may utilize string dissimilarity to clump similar descriptors together. For example, string dissimilarity might be used to show that genre descriptors "alt rock" and "alternative" should be clumped together and viewed as the same. Moreover, string dissimilarity could be used across all attribute categories and descriptors to identify, statistically, how to group the attributes based on differences. Accordingly, suitable clustering algorithms, such as string dissimilarity or other algorithms may be used to group items or attributes.

It will be appreciated that a particular file having the capacity to include metadata in a given category may not include any information in that category. For example, a given song may simply not include the composer's name, even when the composer metadata attribute is associated with that song. However, because the presently described method does not rely on a static or hierarchical listing of metadata attributes, songs that have empty datasets for a given attribute are simply categorized according to the metadata datasets they do have.

It should be noted that the discriminative power can be based not only upon the variance but upon the distribution of values for that facet. For example, a facet that clusters well into between 5 and 10 clusters may be ranked higher than a facet that clusters into 100 clusters. Furthermore, the number of clusters per range parameters could be determined by interface constraints.

It should further be noted that facets which are not valid for a given collection, e.g. image attributes that are not defined for a music collection, will automatically have a low (0) discriminative power since they will all have the same value (null).

Moreover, non-intrinsic measures could be used to choose discriminative facets. For example, the method could be implemented to factor in the number of other users who chose a particular facet to weight that facet's score.

Once the useful facets are identified, these facets are displayed to the user at 18. As implied above, the method is not necessarily dependant upon any particular display device and may be tailored to fit the size and needs of the display device and controller that will be used. Accordingly, suitable display devices include, but are not limited to, computer displays, cell phone and PDA displays, remote controls, in-car displays such as GPS systems, DVD screens, other desktop, laptop, or handheld devices, or any other suitable device.

At 20, the method receives the facet selection from the user. Once a facet selection is received, a list of the attribute values may be presented to the user. Each attribute value may then be linked to all of the items (e.g. documents, song files, pictures, etc.) having that value for the selected facet.

For example, in a song collection, if the facets are "artist name" and "album title" are presented and the user selects "album title," the user may then be presented with a list of all of the albums in the collection. Each album title may further be accompanied with information regarding the number of items (i.e. songs) in the collection that have that album title listed as the value in the album title attribute and may further be linked to each of the corresponding song files.

Alternatively, if the user selected facet has a number of values that is below a certain threshold, a list of the attribute values (or ranges) for that facet is presented to the user. On the other hand, if the user-selected facet has a number of values that is above the threshold, a clustering algorithm may be run to collapse the entire set of values into cluster or ranges. Upon further user-selection of a cluster or range, the values (or items) corresponding to the user-selection may be displayed. The threshold may be determined by any number of suitable factors including, but not limited to, display size, user preference, application, aesthetic taste, etc.

Alternatively or additionally, some or all of the items may be displayed along with or instead of the facets, values, clusters or ranges. Moreover, the displayed facets may be presented in parallel with a list of sub-categories showing associated values and the number of items belonging to each sub-category.

Once presented with the attribute values, the user may either select a value (e.g. a particular album title) to narrow the current search parameters, or select a different facet (i.e. "artist name") to see the collection distributed in a different way.

It will be appreciated that the method can be easily tailored for use with any type of device having any type of user interface including, but not limited to, a mouse, keyboard, remote control buttons, scrolling wheel, thumb pad, joystick etc. Because the method divides the collection items into easily manageable subcategories, the method lends itself to applications where a user may scroll through various menus in order to select a particular desired item. Accordingly, while the method is certainly appropriate for applications involving a large display screen and highly manipulable user input devices, it is equally appropriate for applications involving small display screens and user input devices having very limited manipulability (e.g. those that employ a joystick or only a few control buttons).

It should be appreciated that information that is used to group the items may not be limited to metadata. Or, alternatively, it may be considered that the method may be configured to incorporate programs or data obtained from other sources into the metadata for a given item. For example, if the method is being used to navigate collections of photographs, a face detection program that is capable of counting the number of faces in the photograph may be used as a means for categorization. For example, a user may be able to select a "number of faces" facet and then select from photographs in which 1, 2, 3, or 4+ faces are identified.

Figure 2:
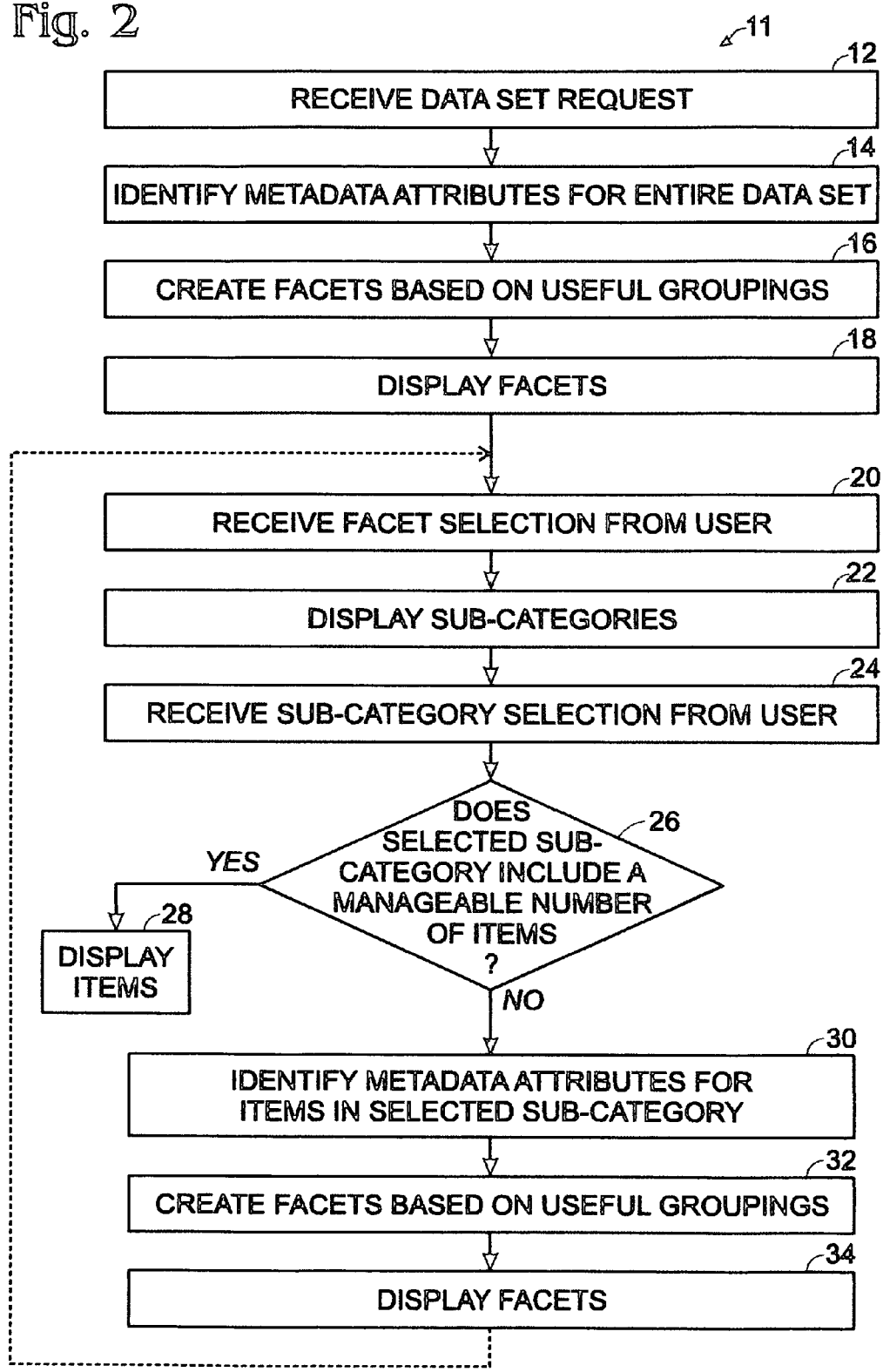
FIG. 2 provides a flowchart of a data navigation system according to another embodiment of the present invention.

It will be appreciated that a user may wish to employ method 10 in an iterative process in which the user narrows down the size of the collection with each iteration. An example of an iterative method 11 is shown in FIG. 2. For ease of discussion, steps in methods 10 and 11 that are the same or similar have been given the same identifiers.

Accordingly, in FIG. 2 at 12, a data set request is received from the user. At 14, metadata attributes are identified for the entire data set (i.e. collection.) At 16, facets are created based on useful groupings and the facets are displayed to the user at 18. At 20, a facet selection is received from the user and at 22 the values or a range of values corresponding to the selected facet are displayed as a list of selectable sub-categories. In order to narrow down the collection, the user may select one of the sub-categories. Accordingly, at 24, a sub-category selection is received from the user.

At 26, it is determined whether the sub-category selected by the user includes a manageable number of items. It will be appreciated that simply reducing the number of possible items of interest to the user from, say 10,000, to, say 4000, might not reduce the number of items to a number of items that is manageable for the user. Again, what is a manageable number of items may be dictated by and/or dependant on user preference and/or on the application/device in which the method is implemented. Accordingly, in some applications, 4000 may be considered a manageable number of items while other applications may require or prefer the manageable number of items to be 2. As such, a particular embodiment of the method may allow for the identification of a threshold number which is used to determine whether the number of items in the selected sub-category is manageable for the user. This threshold number may be adjusted dynamically by the application or user, or may be a static predetermined number.

If it is determined that the sub-category selected by the user does include a manageable number of items, (e.g. if the number of items in the facet is above the threshold number) the method proceeds to step 28 and displays the items to the user.

Alternatively, if it is determined that the sub-category selected by the user includes greater than a manageable number of items, the method proceeds to step 30.

It will be appreciated that certain metadata attributes that were present in the collection at step 14, may not exist for the narrowed down list of items. Accordingly, at 30, the metadata attributes for the items in the selected sub-category are identified.

At 32, the method re-groups the items in the selected sub-category based on the attributes and corresponding attribute values identified in step 30 to create a new set of facets. Again, the items are grouped into a useful number of facets that include a somewhat evenly distributed number of attributes. It will be appreciated that the number of facets into which the items are grouped at step 32 may be the same, similar to, or different from the number of facets provided at step 18, depending on user preference, application, device size or other factors. It will be further appreciated that the same or different methods for creating the groupings as those described above with respect to step 16 in FIG. 1 may be utilized.

It further will be appreciated that metadata attributes that were not considered useful for creating groupings at step 16, may be useful now that the data set has been pared down. For example, a given attribute value that applied to 75% of the original 10,000 songs, may only apply to 25% of the pared down list of 4,000 songs. Accordingly, this attribute may be useful at step 26, even though it was not useful at step 16.

At 34, the facets identified in step 32 are displayed to the user. As shown, the method may be iteratively repeated if desired and as needed.

It should be appreciated that while methods 10 and 11 are shown as incorporating a number of steps by way of example, it should not be assumed that a method according to the present disclosure would require all the disclosed steps or exclude the addition of other steps. Nor should it be assumed that the steps must be performed in the order described.

Figure 3:
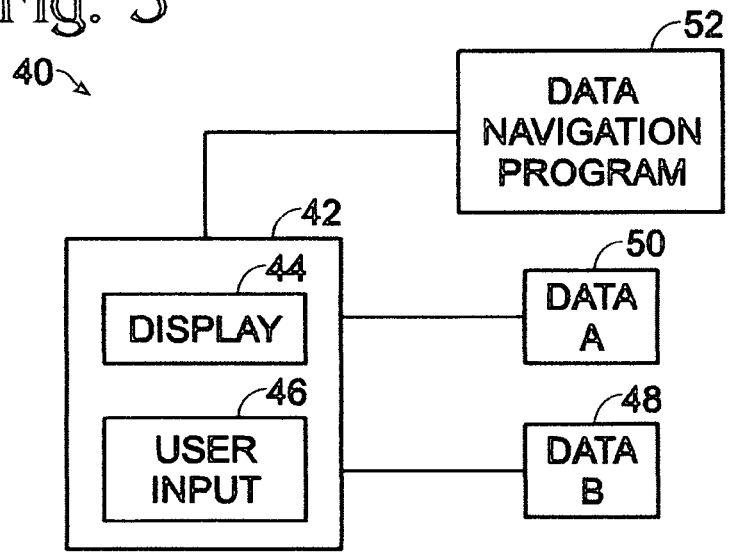
FIG. 3 provides a block diagram of a system according to an embodiment of the present disclosure.

FIG. 3 provides a system 40 suitable for performing dynamic data navigation. As shown, System 40 includes a device 42 including a display 44 and a user input 46. Device 42 may be a personal computer, PDA, cell phone, remote control, car navigation system, DVD player, or any other portable or non-portable device capable of storing and/or retrieving data. Display 44 may take the form of a computer monitor, display screen, or the like. User input 46 may take the form of a keyboard, joystick, control pad, or any other suitable device. Device 42 may be in electronic communication with one or more data sources, 48, 50, also shown as data source A and B, respectively. As an example, device 42 may be a personal computer and data sources A and B may be servers or other computers capable of communicating with the personal computer over the internet. As shown, device 42 is also in communication with data navigation program 52. It will be understood that data navigation program 52 may be hosted on a computer or server that is in networked communication with device 42. The communication between device 42 and the data and navigation programs may be wired, wireless, or a combination thereof.

Figure 4:
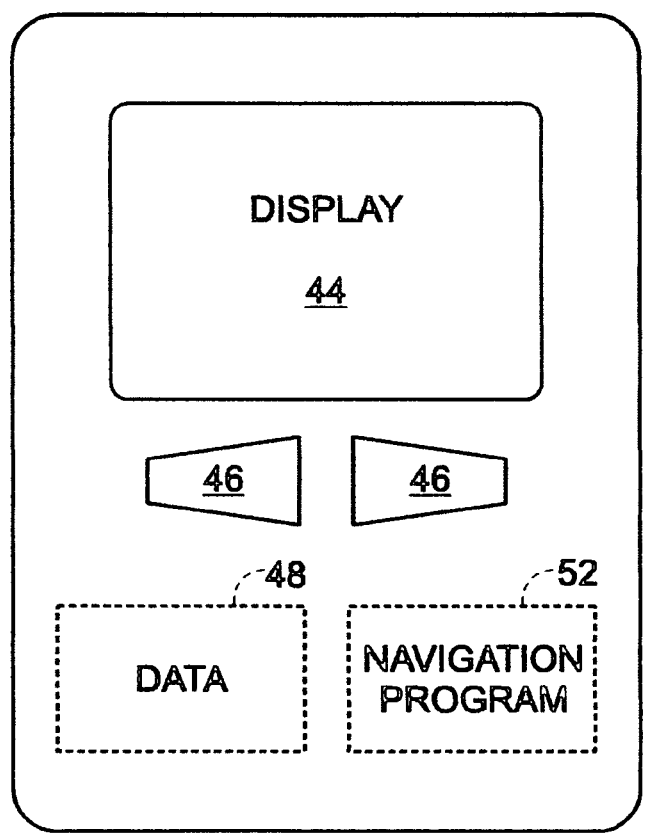
FIG. 4 provides a block diagram of another system according to an embodiment of the present disclosure.

FIG. 4 provides an alternate embodiment of a system 41 that is suitable for performing dynamic data navigation. In System 41, the data 48 and navigation program 52 reside within device 42. As shown, device 42 may further contain a display 44 and user input(s) 46. Device 42 may be, for example, and without limitation, a digital camera, PDA, cellular phone, remote control, home computer, or the like.

It should be appreciated that various combinations and sub-combinations of the devices and systems shown in FIGS. 3 and 4 may be utilized. For example, device 42 may take the form of a wireless PDA or other device that is both capable of accessing data and a navigation program via a wired or wireless internet connection as well as hosting data and/or a navigation program internally. Furthermore, it should be appreciated that various other configurations for a system suitable for performing dynamic data navigation are possible and that the systems shown in FIGS. 3 and 4 are provided as non-limiting examples.

Furthermore, It should be understood that while systems are shown having various components by way of example, nothing in the present disclosure should be interpreted as requiring all of the components shown or disallowing the addition of other components.

While the invention has been described with reference to the exemplary embodiments thereof, those skilled in the art will be able to make various modifications to the described embodiments without departing form the true spirit and scope of the disclosure. Accordingly, the terms and descriptions used herein are set forth by way of illustration only and are not meant as limitations.

What is claimed is:

1. A method comprising:
   performing, by a computer:

receiving a first data set request;
dynamically identifying metadata attributes associated with items in a first data set, in response to the first data set request, wherein dynamically identifying the metadata attributes comprises determining which metadata attributes associated with the items in the first data set are shared by at least a subset of the items;
creating a first set of discriminative facets based on the identified metadata attributes;
ranking the discriminative facets in the first set;
selecting for display a subset of the first set of facets based on the ranking;
causing display of only those facets that are in the selected subset;
receiving a second data set request at a different time than a time of the first data request;
dynamically identifying metadata attributes associated with items in a second data set, in response to the second data set request, the second data set being a modified version of the first data set, wherein at least one metadata attribute associated with the first data set is not present in the metadata attributes associated with the second data set;
creating a second set of discriminative facets based on the identified metadata attributes for the second data set request;
ranking the discriminative facets in the second set; and
selecting for display a subset of the second set of facets based on the ranking of the discriminative facets in the second set.

2. The method of claim 1 further comprising computing a discriminative score value for each of the identified metadata attributes associated with the items in the first data set, wherein the selecting the subset of the first set of facets is based on the computed discriminative score values.

3. The method of claim 2, wherein computing the discriminative score value for a first of the identified metadata attributes associated with the items in the first data set is based on a count of distinct values of the first identified metadata attribute.

4. The method of claim 2, wherein computing the discriminative score value for a first of the identified metadata attributes associated with the items in the first data set is based on a number of clusters of values of the first identified metadata attribute.

5. The method of claim 1 where the subset of the first set of facets is selected for display based on respective distributions of values for the identified metadata attributes over the items in the first data set.

6. The method of claim 1 further comprising displaying a value or a range of values for at least one of the facets in the selected subset of the first set of facets.

7. The method of claim 1 further comprising:
receiving selection of a facet from the selected subset of the first set of facets; and
displaying a sub-grouping, value, or range of values of the selected facet.

8. The method of claim 1 further comprising:
after causing display of the facets in the selected subset of the first set of facets, receiving a sub-grouping selection from a user;
determining if a number of items in the selected sub-grouping has a specified relationship with respect to a threshold;
in response to determining that the number of items in the selected sub-grouping has the specified relationship with respect to the threshold, dynamically identifying metadata attributes for the items in the selected sub-grouping;
creating another set of discriminative facets based on the identified metadata attributes for the items in the selected sub-grouping;
causing display of at least a subset of the another set of discriminative facets.

9. The method of claim 1 wherein a number of facets in the subset of the first set of facets is less than a number of the identified metadata attributes associated with the items in the first data set.

10. The method of claim 1 wherein the facets in the subset of the first set of facets are selected for display using a clustering algorithm.

11. The method of claim 10 wherein the clustering algorithm is a string dissimilarity algorithm.

12. The method of claim 1 wherein a particular discriminative facet in the first set of discriminative facets includes a substantially evenly distributed number of items.

13. The method of claim 1, wherein determining which metadata attributes are shared by at least the subset of the items in the first data set comprises determining which metadata attributes are shared by at least a specified number or percentage of the items in the first data set.

14. The method of claim 1, wherein the identified metadata attributes associated with the items in the first data set include the shared metadata attributes but not any metadata attribute not shared by at least the subset of items.

15. A system comprising:
a computer; and
a data navigation program executable in the computer to:
receive a first data set request;
dynamically identify metadata attributes associated with items in a first data set, in response to the first data set request, wherein dynamically identifying the metadata attributes comprises determining which metadata attributes associated with the items in the first data set are shared by at least a subset of the items;
create a first set of discriminative facets based on the identified metadata attributes;
rank the discriminative facets in the first set;
select for display a subset of the first set of facets based on the ranking;
cause display of only those facets that are in the selected subset;
receive a second data set request at a different time than a time of the first data request;
dynamically identify metadata attributes associated with items in a second data set, in response to the second data set request, the second data set being a modified version of the first data set, wherein at least one metadata attribute associated with the first data set is not present in the metadata attributes associated with the second data set;
create a second set of discriminative facets based on the identified metadata attributes for the second data set request;
rank the discriminative facets in the second set; and
select for display a subset of the second set of facets based on the ranking of the discriminative facets in the second set.

16. The system of claim 15 wherein selecting the subset of facets of the first set of facets is based on capabilities of a display of the system.

17. The system of claim 15, wherein determining which metadata attributes associated with the items in the first data set are shared by at least the subset of the items in the first data set comprises determining which metadata attributes are shared by at least a specified number or percentage of the items in the first data set.

18. A non-transitory storage medium storing program code executable by a system to:
receive a first data set request;
in response to the first data set request, dynamically identify metadata attributes associated with items in a first data set, wherein dynamically identifying the metadata attributes comprises determining which metadata attributes associated with the items in the first data set are shared by at least a subset of the items;
create a first set of discriminative facets based on the identified metadata attributes;
rank the discriminative facets in the first set;
select for display a subset of the first set of facets based on the ranking;
cause display of only those facets that are in the selected subset;
receive a second data set request at a different time than a time of the first data request;
dynamically identify metadata attributes associated with items in a second data set, in response to the second data set request, the second data set being a modified version of the first data set, wherein at least one metadata attribute associated with the first data set is not present in the metadata attributes associated with the second data set;
create a second set of discriminative facets based on the identified metadata attributes for the second data set request;
rank the discriminative facets in the second set; and
select for display a subset of the second set of facets based on the ranking of the discriminative facets in the second set.

19. The non-transitory storage medium of claim 18 wherein a number of facets in the selected subset of the first set of facets is determined by a size of the user interface.

20. The non-transitory storage medium of claim 18 wherein the program code is executable to further compute discriminative scores for the respective identified metadata attributes associated with the items in the first data set, the computing based on a distribution of the items in the collection across metadata categories.

21. The non-transitory storage medium of claim 18, wherein the program code is executable to further:
after causing display of the facets in the selected subset of the first set of facets, receive a sub-grouping selection from a user;
determine if a number of items in the selected sub-grouping has a specified relationship with respect to a threshold;
in response to determining that the number of items in the selected sub-grouping has the specified relationship with respect to the threshold, dynamically identify metadata attributes for the items in the selected sub-grouping;
create another set of discriminative facets based on the identified metadata attributes for the items in the selected sub-grouping;
cause display of at least a subset of the another set of discriminative facets.

* * * * *